June 1, 1943.  J. E. ERICKSON  2,320,857
PRESSING MACHINE
Filed Feb. 16, 1939  5 Sheets-Sheet 1
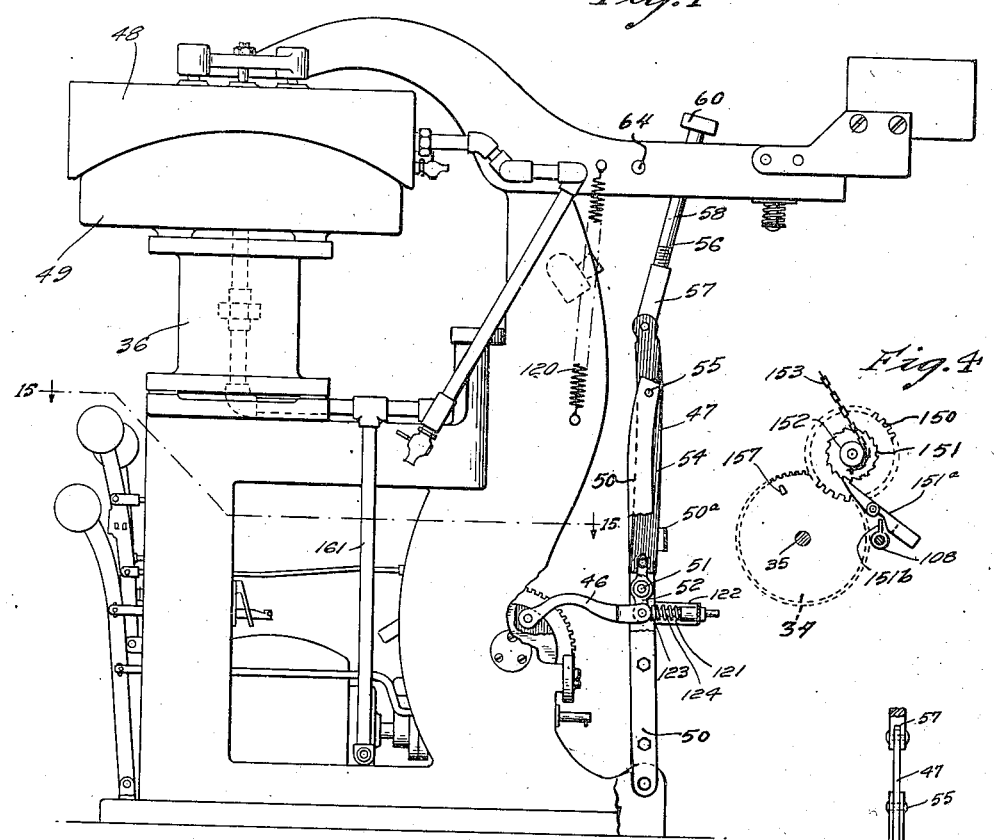
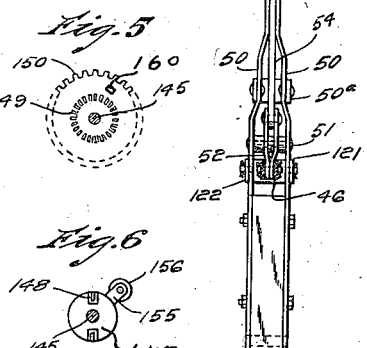
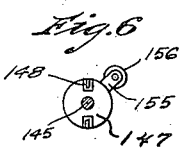
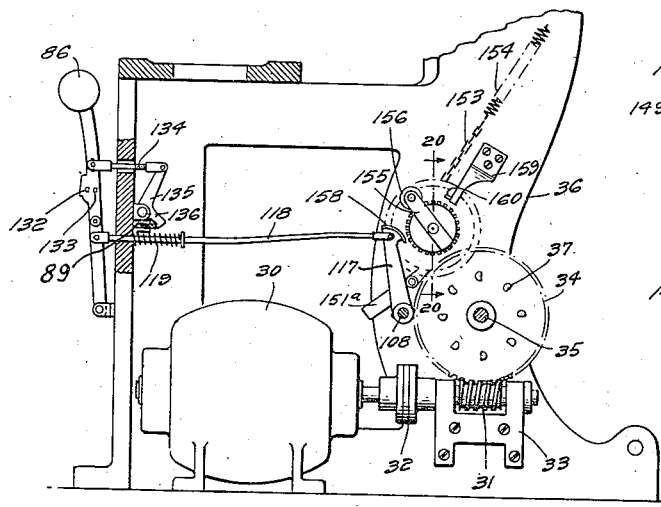

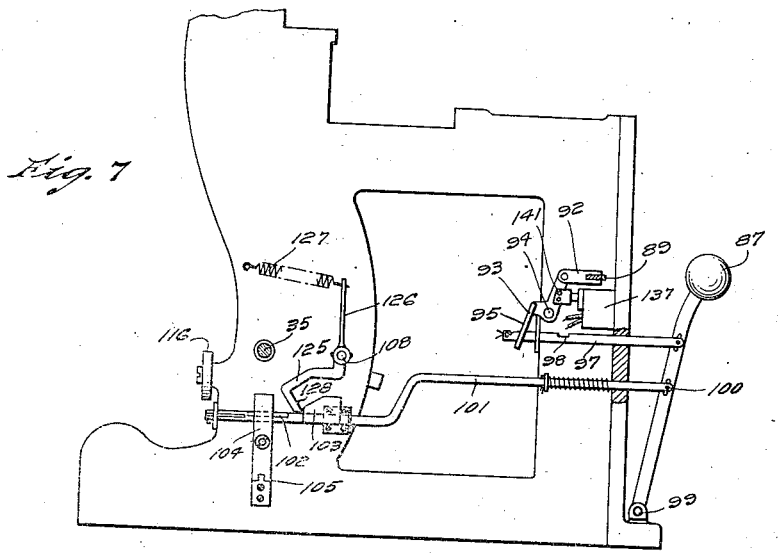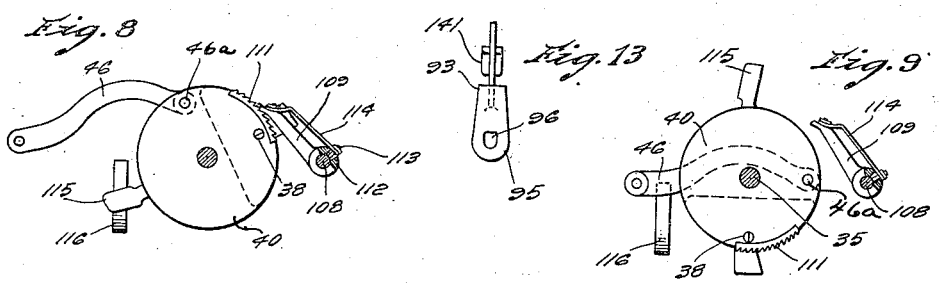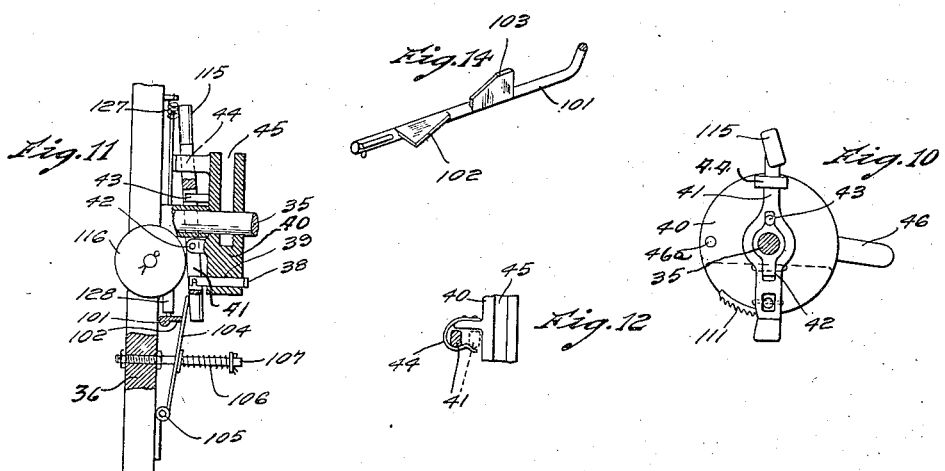

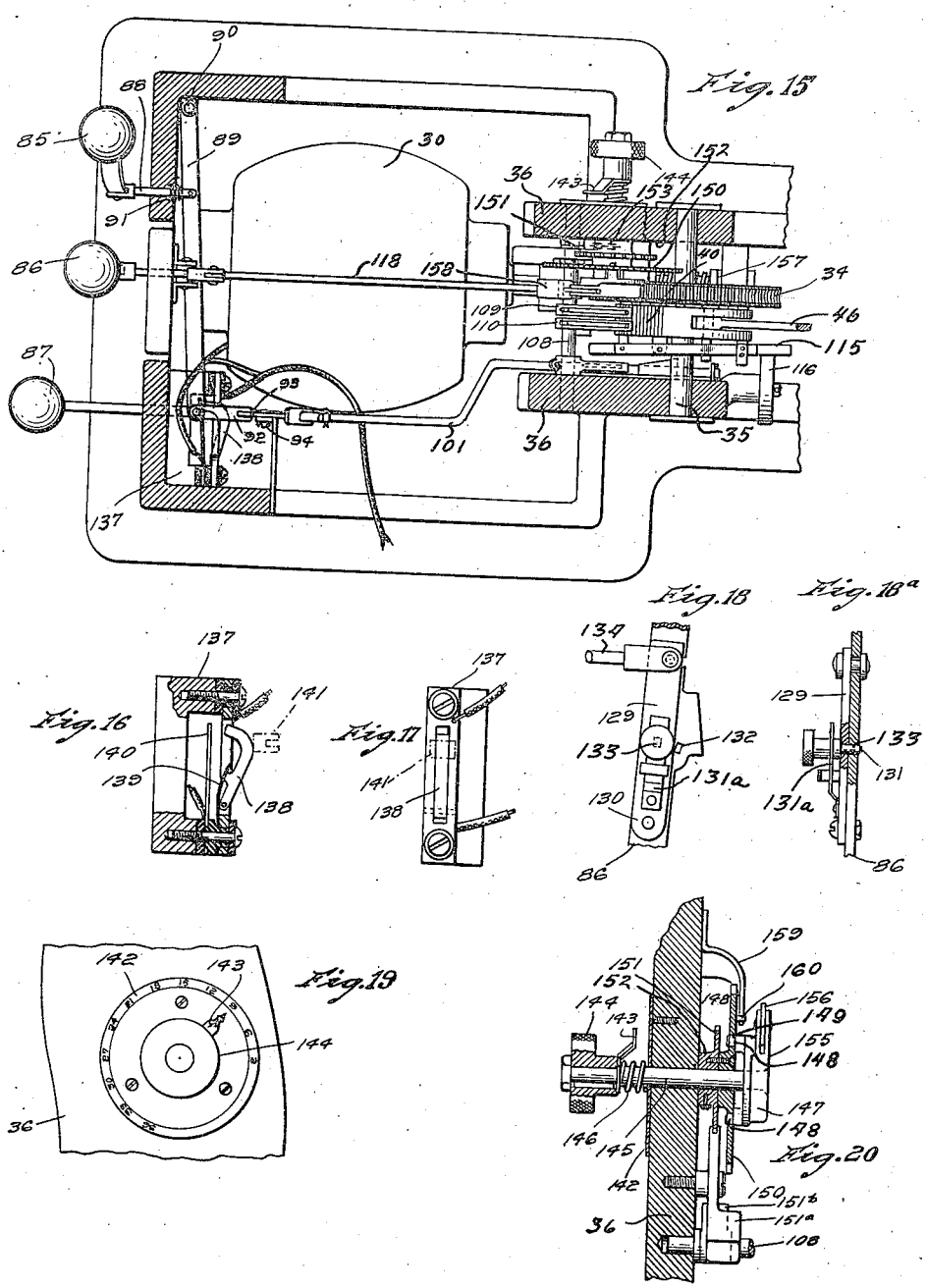

June 1, 1943.  J. E. ERICKSON  2,320,857
PRESSING MACHINE
Filed Feb. 16, 1939  5 Sheets-Sheet 4
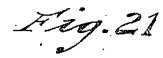
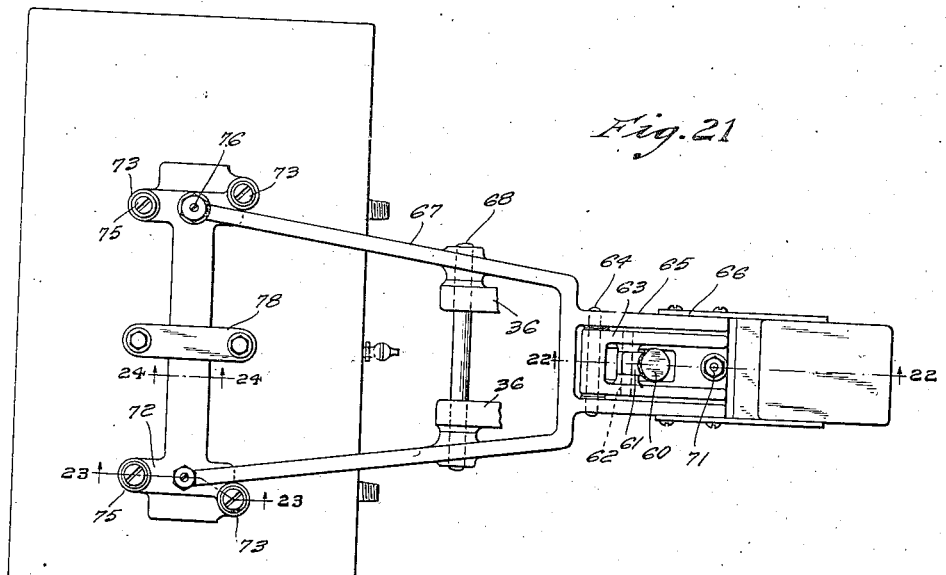
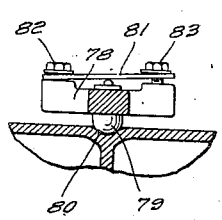
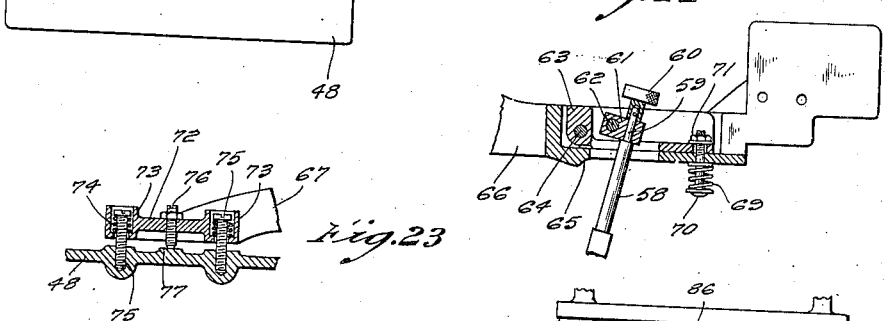
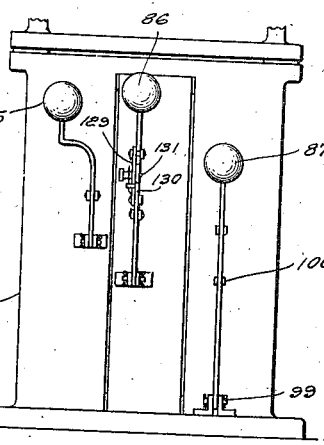
INVENTOR
BY John E. Erickson
Nathaniel Frucht
ATTORNEY June 1, 1943.  J. E. ERICKSON  2,320,857
PRESSING MACHINE
Filed Feb. 16, 1939   5 Sheets-Sheet 5

INVENTOR
John E. Erickson
Nathaniel Frucht
ATTORNEY

Patented June 1, 1943

2,320,857

UNITED STATES PATENT OFFICE 2,320,857

PRESSING MACHINE

John Erick Erickson, Pawtucket, R. I., assignor to Raymond Healey, Cumberland, R. I.

Application February 16, 1939, Serial No. 256,709

4 Claims. (Cl. 38—38)

My present invention relates to pressing machines, and more particularly to power pressing machines designed for hand operation.

It is the principal object of my invention to provide a pressing machine constructed of a small number of working parts, which is easily operated to produce an improved pressing of garments and the like.

Another object of my invention is to provide an arrangement which has a high pressing pressure and thus increases the efficiency of the pressing operation.

An additional object of my invention is to provide a control mechanism for manually regulating the pressure, whereby the machine is readily adapted to press different kinds of materials.

A further object of my invention is to provide a construction which utilizes an automatic timing device selectively controlling the pressing time, in accordance with the judgment of the operator.

Still another object of my invention is to provide a control mechanism so that the operation can be instantly changed from automatic to hand control, and vice versa.

Still another object of my invention is to provide a safety control for pressing machines, so that it is impossible for the operator to have his hands caught, or for the machine to operate prematurely.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 1 is a side elevation of the novel pressing machine;

Fig. 2 is a sectional detailed view showing the motor operating mechanism;

Fig. 3 is a front detail of the pressure lever;

Figure 26:
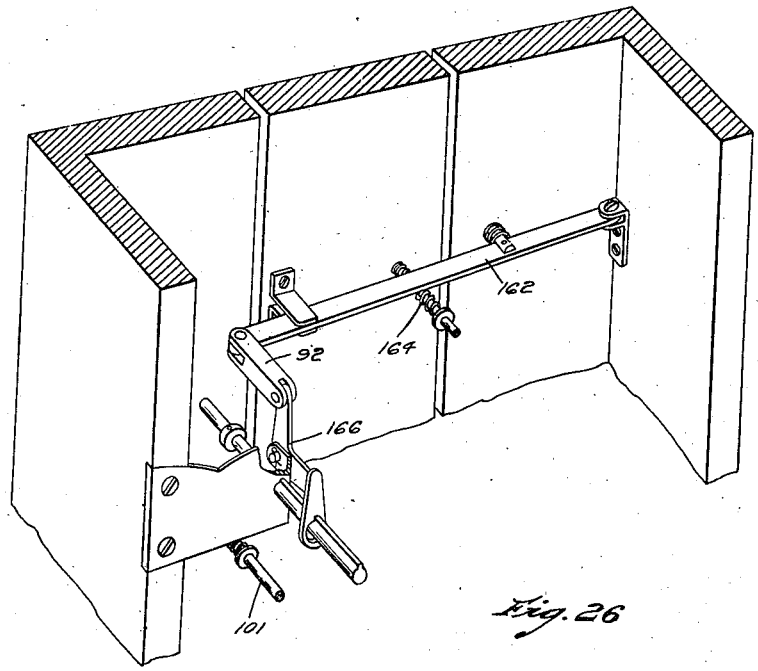
Figure 27:
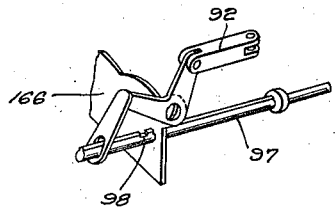

Figs. 4, 5, and 6 are detailed views of the timing mechanism;

Fig. 7 is a sectional detail showing the starting lever mechanism;

Figs. 8 and 9 are detailed views showing different positions of the clutch mechanism;

Fig. 10 is a view similar to Fig. 9, but showing the other side thereof;

Fig. 11 is a sectional detail of the clutch apparatus;

Fig. 12 is a fragmentary detail of the clutch lever latch spring;

Fig. 13 is a detailed view of the starting lever latch;

Fig. 14 is a perspective view of the starting lever rod, partly broken away, showing the operating cams;

Fig. 15 is a sectional view on the line 15—15 of Fig. 1;

Figs. 16 and 17 are respectively plan and side views of the electrical contact switch, Fig. 16 being partly broken away;

Figs. 18 and 18a are respectively side and front views, partly broken away, of the mechanism for changing from automatic to manual control;

Fig. 19 is a front view of the timing dial for the automatic timing mechanism;

Fig. 20 is an enlarged sectional detail on the line 20—20 of Fig. 2;

Fig. 21 is a top plan view of Fig. 1, parts being omitted;

Fig. 22 is a sectional detail on the line 22—22 of Fig. 21;

Fig. 23 is a sectional detail on the line 23—23 of Fig. 21;

Fig. 24 is a sectional detail on the line 24—24 of Fig. 21;

Fig. 25 is a front elevation of the base showing the control levers;

Fig. 26 is a perspective view of a modified form of control mechanism;

Fig. 27 is a detailed perspective view of a modified latch mechanism; and

Figure 28:
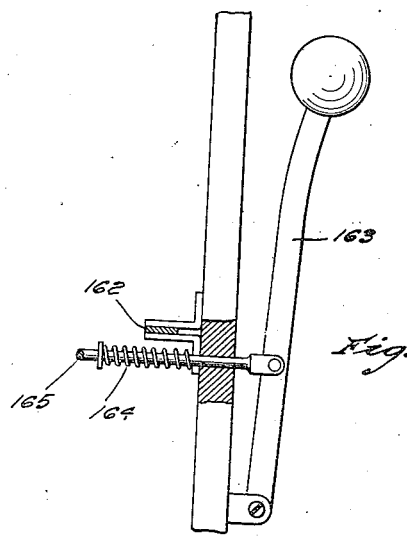

Fig. 28 is a side elevation, parts being broken away, of the modified central control lever.

Referring to the drawings, the novel invention includes a pressure lever arrangement for bringing a movable head into pressing engagement with a pressing buck, through controlled actuation of an electric motor. The motor is clutched to the pressure lever mechanism, and the clutch is either automatically or manually actuated as desired by the operator. A control system is provided which requires hand manipulation of two separate levers in order to accomplish the pressing operation.

*The pressure lever mechanism*

The pressing machine includes a fixed pressing buck and a movable head, the movable head being operated by a pressure lever system so as to apply a predetermined, manually adjustable, pressure to the buck. The lever system is actuated by means of a clutch mechanism which is manually controlled for operation from an electric motor, or may be automatically controlled at the will of the operator.

Referring to Fig. 2 of the drawings, the motor 30 is connected to a source of electric power, and actuates a worm 31 by means of a coupling 32, the worm being mounted for rotation in a suitable support bracket 33. The worm 31 is operatively geared to a gear wheel 34, which is rotatably mounted on a cross shaft 35 suitably supported in the frame-work 36 of the machine. A plurality of clutch teeth 37 project laterally from one side of the gear wheel, and are adapted to be engaged by a cooperating pin 38, see Fig. 9, which is slidably mounted in a bore 39, Fig. 11, in a clutch body 40, such clutch body being also rotatably mounted on the shaft 35 in parallel spaced relation to the gear wheel 34. The clutch pin 38 is inserted into or withdrawn from engagement with the clutch teeth 37, in accordance with oscillating movements of a clutch lever 41 mounted on a support bearing 42 which is secured to one face of the clutch body 40. An aligning pin 43 is preferably provided, see Fig. 10, to guide the oscillating movements of the lever 41, and a latch spring 44, see Figs. 10, 11 and 12, is provided on the clutch body to releasably retain the lever 41 in clutching or declutching position, the lever 41 being manually controlled, as hereinafter described.

The clutch body 40 is U-shaped in cross-section, as indicated in Fig. 11, to provide a slot or space 45 for accommodating a link 46, the link being pivoted at 46a to the clutch body. The link 46 operates a toggle mechanism generally designated as 47, see Fig. 1, for moving head 48 into pressing engagement with the fixed buck 49, which is rigidly positioned on the frame 36.

The toggle device 47 includes two spaced arms 50, shaped as illustrated in Fig. 3, a cross shaft 51 being mounted between the two arms 50 to support a rocker 52, the lower end of said rocker being pivotally connected to the link 46. The upper end of the rocker 51 is slidably mounted in a slot in the lower end of a curved arm 54, the curved arm 54 being pivotally mounted adjacent its upper end, as indicated at 55, between the upper ends of the arms 50. An adjustment link 56 is pivotally mounted at the upper end of the curved arm 54, and comprises a lower socket member 57 and an upper rod 58, the rod and the socket member being correspondingly threaded to permit adjustable variation of the length of the adjustment link. The rod 58 has a reduced neck portion 59, Fig. 22, at its upper end, and terminates in a manually graspable hand wheel 60 for length adjustment, the reduced neck 59 being rotatably mounted in a block 61, see Fig. 22, which is pivotally secured as at 62 to an inner housing member 63, which in turn is pivoted as at 64 to an outer housing member 65 in the movable head pressure lever 66, which as shown in Fig. 21, consists of an open frame pivotally mounted on a cross shaft 68 suitably supported in the frame 36. A strap 50a may be mounted on the arms 50 to prevent backward movement of the toggle parts.

As shown in Fig. 22, the inner housing is resiliently attached to the outer housing by means of a compression spring which is positioned on a headed rod 70 extending through both housings, the upper end of the rod being threaded for engagement with an adjusting nut 71, whereby the compression of the spring 69 and the resulting cushioning action of the pressing pressure is controlled.

The front end of the frame 67 is resiliently pivotally secured to the pressure head 48, by means of resilient end connections and a pivotal central bearing, as hereinafter described. The end connections are shown in Fig. 23, and consist of a crossbar 72 at each end of the open frame, having a pair of sockets 73 at each end, which sockets function as spring retainers to accommodate compression springs 74 which bear against the heads of lock screws 75 threadedly secured to correspondingly threaded bores in the head 48. Intermediate each pair of sockets 73 is mounted a set screw 76 which is adjustably threaded in the crossbar 72 and engages a seating boss 77 on the head 48.

As shown in Figs. 21 and 24, the central bearing arrangement includes a cross plate 78 which is preferably integral with the cross bar 72, the plate 78 having a vertical bore in which a pivot pin 79 is slidably mounted, the lower end of the pivot pin being rounded to seat in a correspondingly rounded socket 80 in the head 48, and the upper end of the pin engaging the under side of a strap 81 held fast to the plate 78 at one end by a bolt 82, and resiliently held at the other end by a spring-pressed regulating bolt 83. This arrangement compensates for all inequalities of the head with respect to the buck and to the garment to be pressed, and insures a proper levelling of the pressing head during the pressing operation.

The specific linkage relation of the toggle mechanism ensures a maximum pressure of the movable head against the fixed buck, with a very small expenditure of operating power. It has therefore been found feasible and practical to use a small quarter horse-power electric motor and produce a very high pressing pressure.

I have devised a timing mechanism and timing control which permits the operator to manually engage or operate the pressing machine, or to set the machine so as to automatically open after a predetermined time interval.

Referring now to Fig. 15, the control mechanism includes three levers 85, 86, and 87, the levers being respectively manually actuated to close the electrical circuit to the motor, to stop the machine, and to initiate the clutching movement. Lever 85 has an extension rod 88 which slides in a suitable bore provided in the framework, and is pivotally connected at its end to a cross lever 89 which is pivoted as indicated at 90 at one end to the framework. A compression spring 91 is positioned on the pivot end of the rod 88, and normally urges the lever 89 outwardly. The other end of the lever, see Fig. 7, is pivotally connected to a link 92, which in turn is pivotally connected to a latch lever 93, pivotally supported at 94 in the framework of the machine. The lower end 95 of the latch lever has an opening 96, see Fig. 13, through which a latch rod 97 passes, (see Fig. 7) the latch rod having a notch 98 to releasably lock with the upper end of the opening 96. The latch rod is pivotally connected to the lever 87, which is pivotally mounted at its other end 99 to the framework; also pivotally connected to the lever 87 at 100, Fig. 7, is a cam rod 101 which is slidably mounted at its other end in the frame 36, in a suitable bearing. The inner end of the cam rod has two cams, see Fig. 14, consisting of a horizontal cam plate 102 and a vertical cam plate 103.

The cam plate 102 serves to actuate a member 104 which is hinged at its lower end 105 to the machine frame, a compression spring 106, Fig. 11, mounted on a bolt retainer 107 urging the member 104 into engagement with the cam plate 102. Movement of the pivoted member 104 by the cam plate 102 forces the lower end of the clutch lever 41 inwardly, as illustrated in Fig. 11, to engage the clutch and thus move the toggle lever mechanism into operative position.

Referring now to Fig. 15, an auxiliary shaft 108 is mounted in the framework, and functions as a pivot mounting for two pawls 109, 110, which are alike and are adjacent to each other, see Figs. 8 and 9, for engagement with ratchet teeth 111 on the periphery of the clutch body. One ratchet pawl is slightly longer than the other, to insure holding engagement without appreciable back lash. Each pawl is rotatably secured to the shaft 108, and has a slot 112 through which a pin 113 secured to the shaft extends, the slot being wider than the pin to allow a limited swing of the pawl. A spring blade 114 is connected to each pin, and resiliently engages its pawl to urge it into operative position.

Referring now to Figs. 10 and 11, the operative engagement of the parts actuates the pressing mechanism by rotating the clutch body; when the proper pressing movement has been obtained, the clutch is automatically disengaged by contact of the other end 115 of the clutch lever 41 with a freely rotatable cam disk 116, which causes the other end of the clutch lever to move outwardly and withdraw the pin 38 from engagement with the clutch teeth 37. This stops the machine in pressing position, the duration of the pressing being either manually or automatically controlled.

Fixed to one end of the shaft 108 is a lever 117, see Fig. 2, which is pivotally connected at its outer end to a pull rod 118, the pull rod being pivotally connected to the middle lever 86. A compression spring 119 is mounted on the pull rod 118, and pinned thereto so as to resiliently urge the pull rod inwardly when the middle lever 86 is manually pulled, the shaft 108 is rotated, and the pawls, 109, 110 are lifted out of engagement with the ratchet teeth 111, whereby the clutch body resumes its initial disengaged position. The disengaging movement results from a combination of tension springs 120 (see Fig. 1), having one end fastened to the movable head and the other end to the framework, and a toggle breaking arrangement indicated at 121 in Fig. 1, and comprising a U-shaped saddle 122 in which is slidably mounted a headed rod 123 against which a compression spring 124 acts, the head of the rod 123 thus resiliently pressing against the lower end of the rocker 52 to tend to break the toggle. The above described arrangement permits manual control of the pressing operation, the mechanism being started and released at the will of the operator.

Also mounted on the shaft 108 is a hook lever 125, see Fig. 7, which is fixed on the shaft and has a spring arm 126 to which a tension spring 127 is connected as illustrated. When the lever 87 is in clutch engaging position, the spring 127 will swing the shaft 108 so as to bring the pawls into engagement with the ratchet teeth. The hook end 128 of the hook lever 125 cooperates with the cam plate 103, see Fig. 7, and thus positively insures engagement with and disengagement from the teeth of the pawls in accordance with the movement of the hand lever 87.

In addition to releasing the clutch body, the lever 86 also stops the motor. Referring now to Fig. 25, and Figs. 18 and 18a, an auxiliary lever 129 is pivotally mounted on the lever 86, at its lower end 130, and has a pin 131 spring pressed by a leaf spring 131a and selectively manually insertable in either of two openings 132, 133, for controlling either manual or automatic actuation as hereinafter described. When the pin 131 is positioned in opening 133, the adjustable link 134, which is pivotally connected to the upper end of the auxiliary lever 129, see Fig. 2, actuates a hook lever 135, the hook end 136 normally hooking over the edge of the bar 89 for retaining the bar in operating position. When the lever 86 is pulled outwardly to stop the machine, the hook end 136 is lifted to release the bar 89 so that it will move under the action of spring 91, see Fig. 15, to break the circuit and stop the motor.

Mounted in the same side of the machine adjacent the free ends of the lever 89 is an electrical contact switch 137 of standard construction having a contact arm 138, normally kept in open position by the tension of a spring 139 (see Figs. 7, 15, 16 and 17), the block 141 pressing against the contact arm 138 therein. The contact arm 138 cooperates with a contact blade 140, forced into engagement therewith by pressure of a block of insulating material 141, see Fig. 7, which is secured to one end of lever 93, Figs. 18, 18a, and Fig. 2; when the auxiliary lever 129 is shifted by seating of the pin 131 with the opening 132, the hook end 136 is brought (partly) upwardly, so as to permit automatic timing and release of the bar 89.

A dial 142, see Figs. 19 and 15, is mounted on the side of the framework, and is marked to indicate different pressing times; a movable pointer 143 is operatively connected to a manually engageable handle 144, see Fig. 20, so as to be set for any desired timing on the dial 142, the handle being keyed to a shaft 145 which is slidably mounted in the frame work, and is slidably urged outwardly by a spring 146. Secured to the rear end of the shaft 145 is a lock element 147, Fig. 20, having radially opposite engaging pins 148 adapted to selectively engage openings 149 in a gear plate 150, see Figs. 5 and 6, the gear plate being rotatably mounted on the shaft 145 and having a ratchet wheel secured thereto or formed integral therewith, with ratchet wheel 151, the ratchet wheel having a cylindrical hub 152, see Fig. 4, to which one end of a flexible chain 153 is connected. The other end of the chain is secured to a tension spring 154, which in turn is mounted on the frame, see Fig. 2.

Cooperating with the ratchet wheel 151 is a gravity actuated pawl 151a, for retaining the ratchet wheel in position against the tension of the spring 154. A finger 151b is keyed to the shaft 108, see Fig. 4, whereby rotation of the shaft 108 causes the gravity actuated pawl 151a to be disengaged, and thus permits the chain 153 to return the timing mechanism to its initial position.

Lock element 147 has a roller arm 155 mounted thereon, which carries a roller 156. Mounted on the back of the gear 34 is a single tooth 157, for engagement with the gear 150 (see Fig. 4), whereby the rotation of the motor turns the gear wheel 34 and rotates the gear plate 150 one tooth for each revolution of the gear wheel 34, the roller arm and roller thus rotating until the roller contacts the inclined nose 158 of the lever 117, see Fig. 2, to thus move the lever 117 outwardly and move the stop lever 86 through the medium of the rod 118 to stop the machine, as the outward movement of the stop lever 86 lifts the hook end 136 to release the bar 89 and thus stop the motor, the rotation of the shaft 108 also permitting the movable head to open. A stop 159 is provided, adapted to be engaged by a stop lug 160 on the face of the gear plate 150, to stop the gear plate on its return disengaged movement. The pressing machine is equipped with standard steam supply piping for supplying steam to the movable head and to the buck, such piping, see Fig. 1, being generally designated 161.

It is thus evident that the operation of the machine is as follows: The operator places his left hand on the lever 85, and pulls it outwardly, thereby starting the motor. The lever 85 must be held outwardly by the operator in order to permit movement of lever 87, which is therefore moved by the right hand of the operator so as to engage the clutch and start the mechanism and begin the pressing operation. This requires the operator to use both hands and thus prevents accidents. The pressing position being thus obtained, the movable head may be released by pulling the lever 86, releasing the clutch mechanism and stopping the motor. For automatic operation, the timer pointer is set to the selected pressing period, and the lever 86 is then automatically moved forward at the completion of the selected period.

It is thus evident that the novel pressing machine consists of a relatively small number of parts, which may be readily assembled together, and which function so as to obtain the desired pressing operation, the machine being either manually actuated or automatically controlled as desired.

Referring to Figs. 26, 27 and 28, the construction shown therein is used when it is desirable to relieve the starting and stopping strain on the motor, by running the motor continuously.

In this modified construction, the motor is first started by a manual switch (not shown). The construction of the cross lever 162 is similar to the cross lever 89; however, there is no cooperating mechanism between the cross lever 162 and the central control lever 163. The lever 163 is merely provided with a spring 164 to return it to normal position when the lever is pulled to release the pressing mechanism through the rod 165.

The latch mechanism 166 performs no switching function and is free of the switch 137 and block 141. The operator starts the motor and pulls on the left hand lever. This releases the latch mechanism 166 and permits the right hand lever to be pulled to start the pressing mechanism. The central control lever 163 is used for releasing the pressing mechanism, either by manually pulling the same or by the automatic timing device, the motor continuing to run after the release.

While I have described a specific constructional embodiment of my invention, it is obvious that desired changes in the shape, location, and arrangement of the parts, and in their relative functioning, may be made to suit the requirements of different operating positions, without departing from the spirit and the scope of the invention as defined in the appended claims.

I claim:

1. In a pressing machine, a fixed buck, a movable head, mechanism for operating said head comprising an electric motor, a source of electric power, manually operative means for connecting said motor to said source of power, means for disconnecting said motor from said source of power and means for setting said disconnecting means to disconnect said motor after a predetermined period of time.

2. In a pressing machine, a fixed buck, a movable head, toggle mechanism for operating said movable head, means for operating said toggle mechanism comprising an electric motor and clutch mechanism, a source of electric power, manually operative means for connecting said motor to said source of power, manually operative means for connecting said clutch to said motor, said clutch connecting means being locked by said motor connecting means and being manually operable only after movement of said motor connecting means, means for disconnecting said motor from said source of power and for releasing said clutch mechanism, and means for setting said disconnecting means to disconnect said motor and said clutch after a predetermined period of time.

3. In a pressing machine, a fixed buck, a movable head, toggle mechanism for operating said movable head, a source of power, clutch mechanism for operatively connecting said source of power to said toggle mechanism, said toggle mechanism including means for straightening said toggle and imparting pressure to said movable head after said toggle has caused said movable head to contact said buck, and means for releasing said clutch mechanism to open said toggle after a predetermined period of time.

4. In a pressing machine, a fixed buck, a movable head, toggle mechanism for operating said movable head, means for operating said toggle mechanism comprising an electric motor and clutch mechanism, said toggle mechanism including means for straightening said toggle and imparting pressure to said movable head after said toggle has caused said movable head to contact said buck, a source of electric power, a manually operative lever arrangement for connecting said motor to said source of power, a manually operative lever arrangement for connecting said clutch mechanism to said motor, said clutch connecting lever being releasably locked by said motor connecting lever and being operable only after movement of said motor connecting lever, and a manually operative lever arrangement for disconnecting said motor from said source of power and for releasing said clutch after the pressing operation.

JOHN ERICK ERICKSON.